(12) United States Patent
Allio

(10) Patent No.: US 6,972,744 B1
(45) Date of Patent: Dec. 6, 2005

(54) METHOD FOR AUTOSTEREOSCOPIC DISPLAY

(76) Inventor: Pierre Allio, 81, Rue de la Mare, 75020 Paris (FR)

( * ) Notice: Subject to any disclaimer, the term of this patent is extended or adjusted under 35 U.S.C. 154(b) by 0 days.

(21) Appl. No.: 09/762,730

(22) PCT Filed: Aug. 4, 1999

(86) PCT No.: PCT/FR99/01927

§ 371 (c)(1),
(2), (4) Date: Apr. 10, 2001

(87) PCT Pub. No.: WO00/10332

PCT Pub. Date: Feb. 24, 2000

(30) Foreign Application Priority Data

Aug. 13, 1998 (FR) .................................. 98 10384

(51) Int. Cl.[7] .............................................. G09G 3/36
(52) U.S. Cl. ........................ 345/88; 345/581; 345/589; 345/690
(58) Field of Search ................................ 345/589, 593, 345/690, 88, 581, 139; 348/51, 54, 59, 60

(56) References Cited

U.S. PATENT DOCUMENTS

| | | | |
|---|---|---|---|
| 5,808,599 A | 9/1998 | Allio | |
| 5,936,607 A * | 8/1999 | Allio | .......................... 313/371 |
| 6,184,969 B1 * | 2/2001 | Fergason | .................... 349/196 |
| 6,396,873 B1 * | 5/2002 | Goldstein et al. | ........... 375/240 |
| 6,573,928 B1 * | 6/2003 | Jones et al. | ................... 348/51 |

FOREIGN PATENT DOCUMENTS

WO    WO94/26072    11/1994

* cited by examiner

*Primary Examiner*—Sumati Lefkowitz
*Assistant Examiner*—Aaron S. Ward
(74) *Attorney, Agent, or Firm*—Michael Best & Friedrich LLP

(57) ABSTRACT

The invention relates to a method of autostereoscopically displaying an N-viewpoint image on a screen having display pixels disposed in rows and columns, each display pixel presenting p>1 color points, corresponding to first, second, . . . , and $p^{th}$ color components, in which method the pixels of an autostereoscopic image to be displayed are displayed by distributing in space the p color points of each pixel amongst the color points of corresponding color components in p different display pixels, the method of the invention starting from a "high definition" autostereoscopic image presenting at least as many pixels having p color points as the N viewpoint image has color points to generate a said autostereoscopic image to be displayed in which each pixel is a color point of the corresponding color component of p different pixels in the high definition autostereoscopic image.

25 Claims, 5 Drawing Sheets

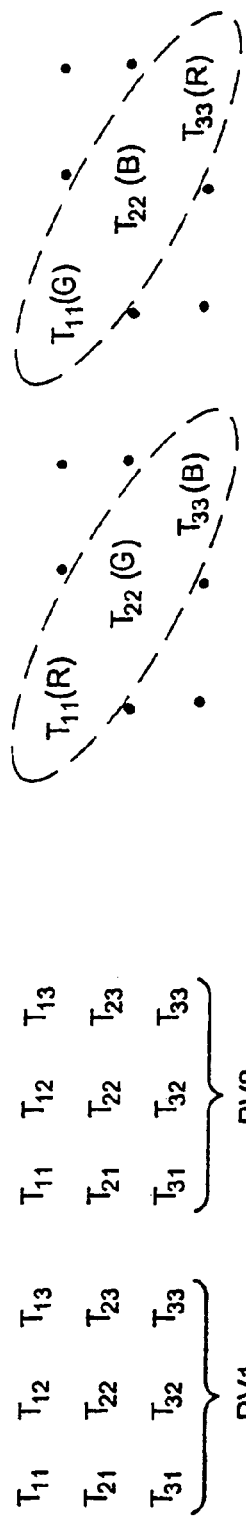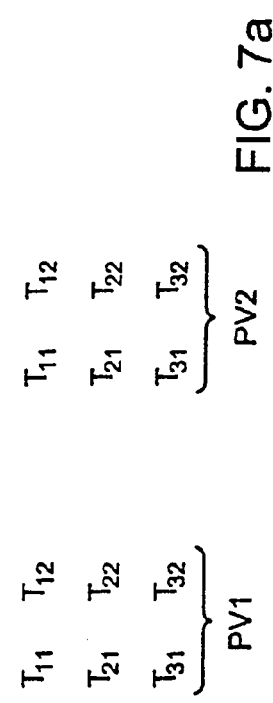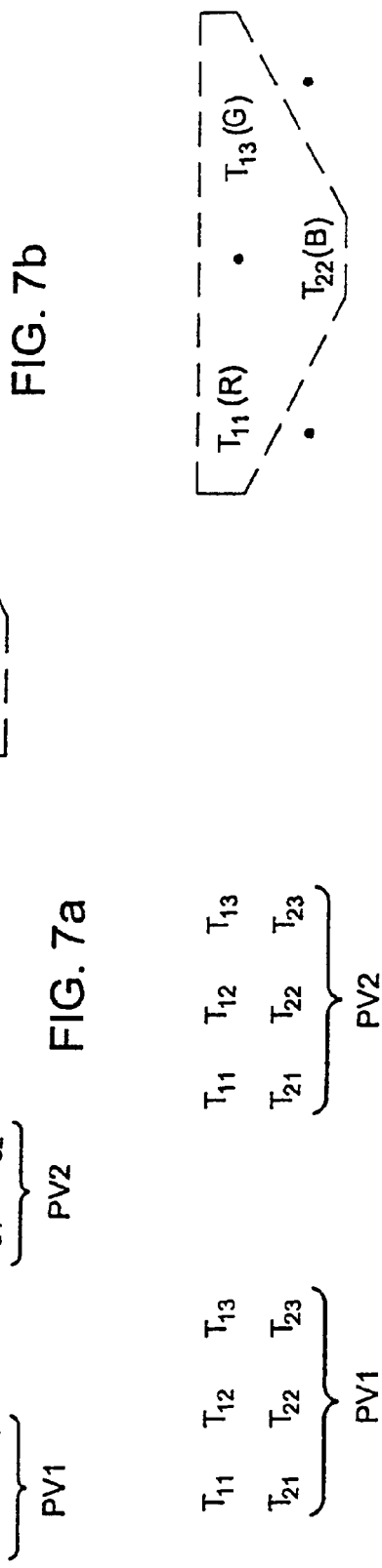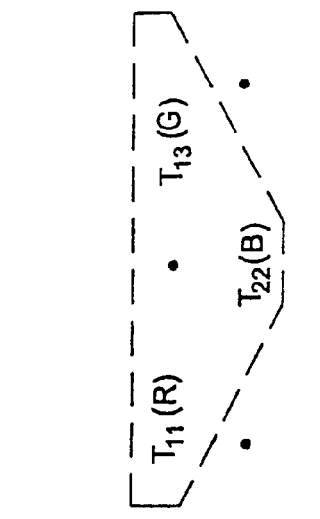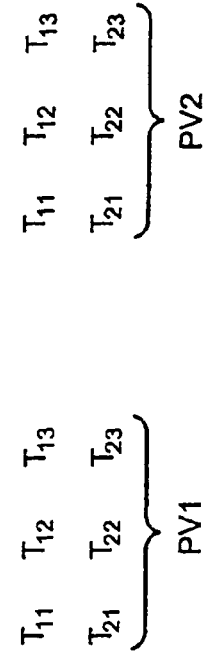

METHOD FOR AUTOSTEREOSCOPIC DISPLAY

The present invention relates to a method of autostereoscopically displaying an N-viewpoint image on a screen having display image points or "pixels" disposed in rows and columns, each display pixel presenting p>1 color points, corresponding to first, second, . . . , and $p^{th}$ color components, in which method the pixels of an autostereoscopic image to be displayed are displayed by distributing in space the p color points of each pixel amongst the color points of corresponding color components in p different display pixels.

BACKGROUND OF THE INVENTION

Such a method is described in PCT application WO 94/26072 filed in the name of the Applicant under the title "An autostereoscopic video device and system", published on Nov. 10, 1994. In that method relating to the case where the video screen pixels are made up of p color points placed side by side in the row direction, the p (e.g. two or three) color components (or color points) for a single image point or pixel in an autostereoscopic image having N viewpoints are distributed over p (e.g. two or three) successive pixels arranged in the row direction of the image. The number N of viewpoints for the image is not a multiple of p, and the lens array has a pitch equal to the product of the color point pitch multiplied by the number of viewpoints.

A method implementing the same principle is described in European patent application No. 0 791 847 (Philips Electronics) entitled "Autostereoscopic display apparatus", published on Aug. 27, 1997. In that method, which seeks to distribute the loss of definition due to having multiple images over both the rows and the columns, the pixels are offset from one row to another by a distance equal to half the pitch of the color points making up the pixels, said offsets being obtained optically in that case by inclining the lenses of the display array relative to the column direction of the display pixels of the screen.

The methods described in the documents mentioned above do not make it possible to compensate, at least in part, the loss of definition due to the presence of N viewpoints.

OBJECTS AND SUMMARY OF THE INVENTION

An object of the present invention is to provide a display method enabling the above-specified problem to be remedied, at least in part.

The present invention thus provides a method of autostereoscopically displaying an N-viewpoint image on a screen having display pixels disposed in rows and columns, each display pixel presenting p>1 color points, corresponding to first, second, . . . , and $p^{th}$ color components, in which method the pixels of an autostereoscopic image to be displayed are displayed by distributing in space the p color points of each pixel amongst the color points of corresponding color components in p different display pixels, wherein, starting from a "high definition" autostereoscopic image presenting at least as many pixels each having p color points as the N viewpoint image presents color points, a said autostereoscopic image to be displayed is generated in which each pixel is a color point of the corresponding color component from p different pixels in the high definition autostereoscopic image.

The distribution between p pixels of the image to be displayed is then implemented on the basis of p different pixels of the high definition autostereoscopic image, whereas in the above-mentioned prior art, this distribution was performed on the basis of p color points coming from the same image point or pixel.

The autostereoscopic image to be displayed can be generated from the high definition image upstream from the screen in a memory or on any recording medium, or else directly by addressing at screen level.

Preferably, the high definition autostereoscopic image presents in the row direction as many pixels each having p color points as each image row presents color points.

Given that the p color components of each pixel carry information coming from p points that are distributed in space, the resulting image presents resolution that is p times better in terms of brightness, whereas color definition has the same resolution as before. The spectator nevertheless perceives an image which subjectively presents definition that is improved by p times because of the improved perception of outlines, whereas the lower definition of the color ("smearing" color effect) is not perceived in stereoscopic vision.

For example, in an image presenting a sloping line segment, the offset between the color components, e.g. red, green, and blue, of the pixels that follow one another in the "high definition" image and that is due to said distribution in space of the original information about the various display pixels, is, in the presence of contrast, perceived by the brain more as a high resolution difference in brightness than as a periodic variation in color. In addition, the spatial distribution of color points has the effect that the two eyes, which see two different viewpoints, generally see different color components through a given lens, thus inducing complementarity from one eye to the other which attenuates perception of the low resolution of the color components. The overall subjective effect is an improvement in the fineness of the image and in the perception of planes (due to the increase in disparity resolution), and the lower color resolution is practically not perceived.

An autostereoscopic image intrinsically presenting high definition can be obtained from a camera, or from an image library, or indeed in the form of synthesized images.

The high definition autostereoscopic image can be generated from a starting autostereoscopic image which presents definition lower than said high definition by using a definition-increasing method, such as an interpolation method, a vectorization method, or an outline search method. The starting autostereoscopic image can be obtained from a camera or from an image library, or indeed in the form of synthesized images.

This makes it possible to benefit from the improvement in image definition that can be obtained by modern methods for processing images digitally. In particular, said lower definition can be the definition of the screen, thus making it possible in particular to start from standard video images.

The high definition autostereoscopic image may be generated by generating for each pixel only the color point that is used when generating said autostereoscopic image to be displayed.

The definition increasing method can increase definition in the row direction and/or in the column direction.

In an embodiment applicable to the display technique described in above-mentioned European patent application No. 0 791 847, and enabling definition to be increased both in the row direction and in the column direction, the high definition autostereoscopic image can be obtained from a starting autostereoscopic image by using said definition-increasing method to generate an intermediate autostereoscopic image presenting either p or p−1 times as many rows and p or p−1 times as many columns of pixels than the screen, and said high definition autostereoscopic image can be obtained by selecting those pixels in the intermediate autostereoscopic image whose positions correspond to said distribution in space.

In the context of this technique, it nevertheless remains advantageous to increase definition in the horizontal or row direction only.

It is advantageous, in particular when said lower definition is screen definition to increase definition by generating an intermediate autostereoscopic image having increased definition that is lower than said high definition, and from which said high definition autostereoscopic image is generated. This applies in particular when p=3 and the increased definition image has p−1 (i.e. two) times as many pixels as the starting autostereoscopic image, whereas the high definition autostereoscopic image has p=3 times as many pixels as the starting autostereoscopic image.

The intermediate autostereoscopic image and/or the high definition image are preferably generated by computing for each pixel only those color points which are "useful", i.e. those which are used in subsequent computations and/or for display.

In a variant of the invention enabling definition to be increased both in the row direction and in the column direction, wherein the high definition autostereoscopic image is obtained from a starting autostereoscopic image having either p or p−1 times as many lines and either p or p−1 times as many columns of pixels than the screen, and wherein the high definition autostereoscopic image is obtained by selecting pixels from the starting autostereoscopic image whose positions correspond to said distribution in space. The same remarks apply as above.

In a particularly advantageous variant, said autostereoscopic image to be displayed, when ordered so as to interleave the pixels of the N viewpoints making it up in accordance with its display topology, comprises groups of N pixels each of which corresponds to a different viewpoint to form an interleaved image as described in the Applicant's PCT application WO 94/26072, the first pixel of a given N pixel group corresponding to a first viewpoint being constituted by a first color point which is the color point of the first color component of the first of said p different pixels of a group of p pixels of the first viewpoint, a second color point which is the color point of the second color component of the second of said different pixels of said group of p pixels of the first viewpoint, . . . , and a $p^{th}$ color point which is the color point of the $p^{th}$ color component of the $p^{th}$ of said different pixels of said group of p pixels of the viewpoint, the second pixel of said given group of N pixels which corresponds to a second viewpoint being constituted by a first color point which is the color point of the second color component of the first of said p different pixels of a group of p pixels of the second viewpoint, . . . , and a $p^{th}$ color point which is the color point of the first color component of the $p^{th}$ of said p different pixels of the group of p pixels of the second viewpoint, . . . , and so on by circular permutation to the $N^{th}$ pixel of said given group which corresponds to the $N^{th}$ viewpoint and to the group of p pixels corresponding thereto. Said groups of N pixels are advantageously repeated in the row direction.

Said p different pixels can be contiguous.

Preferably, said p different pixels are in alignment in the row direction.

The p color points of each display pixel are advantageously placed side by side in the column direction, or preferably in the row direction.

The invention also provides an N viewpoint autostereoscopic image presenting pixels disposed in rows and columns, each pixel being constituted by p color points of a different color component, wherein each of the p color points of each pixel is constituted by a color point of a corresponding color component offset in space in the same manner for each of the p different pixels of a group of p pixels of a viewpoint of a high definition autostereoscopic image presenting at least as many pixels having D color points as the N viewpoint autostereoscopic image presents color points. Said T different pixels are advantageously contiguous and they are preferably in alignment in the row direction. They can also be in alignment, for example, along a diagonal of the high definition autostereoscopic image.

When the image is ordered in such a manner as to interleave the pixels of the N viewpoints making it up in accordance with the topology of its display, the image can comprise groups of N pixels each of which corresponds to a different viewpoint, the first pixel of a given group of N pixels which corresponds to a first viewpoint being constituted by a first color point which is the color point of the first color component of the first of said p different pixels of a p-pixel group of the first viewpoint, a second color point which is the color point of the second color component of the second of said different pixels of the said p-pixel group of the first viewpoint, . . . , and a $p^{th}$ color point which is color point of the $p^{th}$ color component of the $p^{th}$ of said different pixels of said p-pixel group of the viewpoint, the second pixel of said given group of N pixels which corresponds to a second viewpoint being constituted by a first color point which is the color point of the second color component of the first of said p different pixels of a p-pixel group of the second viewpoint, . . . , and a $p^{th}$ color point which is the color point of the first color component of the $p^{th}$ of said p different pixels of said p pixel group of the second viewpoint, and so on by circular permutation to the $N^{th}$ pixel which corresponds to the $N^{th}$ viewpoint and to the p-pixel group corresponding thereto.

The invention also provides an image displayed or printed on a medium, the image being displayed or printed from an autostereoscopic image in the form of display points or pixels which are obtained by distributing the p color points of each pixel of said autostereoscopic image between the color points of corresponding color components of p different display pixels.

The invention also provides a recording medium such as a hard disk, a DVD disk, or a magnetic tape presenting at least one recorded autostereoscopic image, as defined above.

Finally, the invention provides a transmission system in particular via cables or radio links, essentially by satellite, including a transmitter device for transmitting autostereoscopic images as defined above.

BRIEF DESCRIPTION OF THE DRAWINGS

Other characteristics and advantage of the invention will appear better on reading the following description given by way of non-limiting example and with reference to the accompanying drawings, in which:

FIGS. 6a and 6b show a fourth variant of the invention, corresponding to the case shown in FIGS. 4A and 4B of the above-cited European application No. 0 791 847;

FIGS. 7a and 7b show a fifth variant of the invention, corresponding to the case shown in FIGS. 5A and 5B of European application No. 0 791 847;

FIGS. 8a and 8b show a sixth variant of the invention, corresponding to the case shown in FIGS. 6A and 6B of European application No. 0 791 847; and FIG. 9 shows definition being increased by computing intermediate pixels, starting from an image of lower definition.

MORE DETAILED DESCRIPTION

Figure 1:
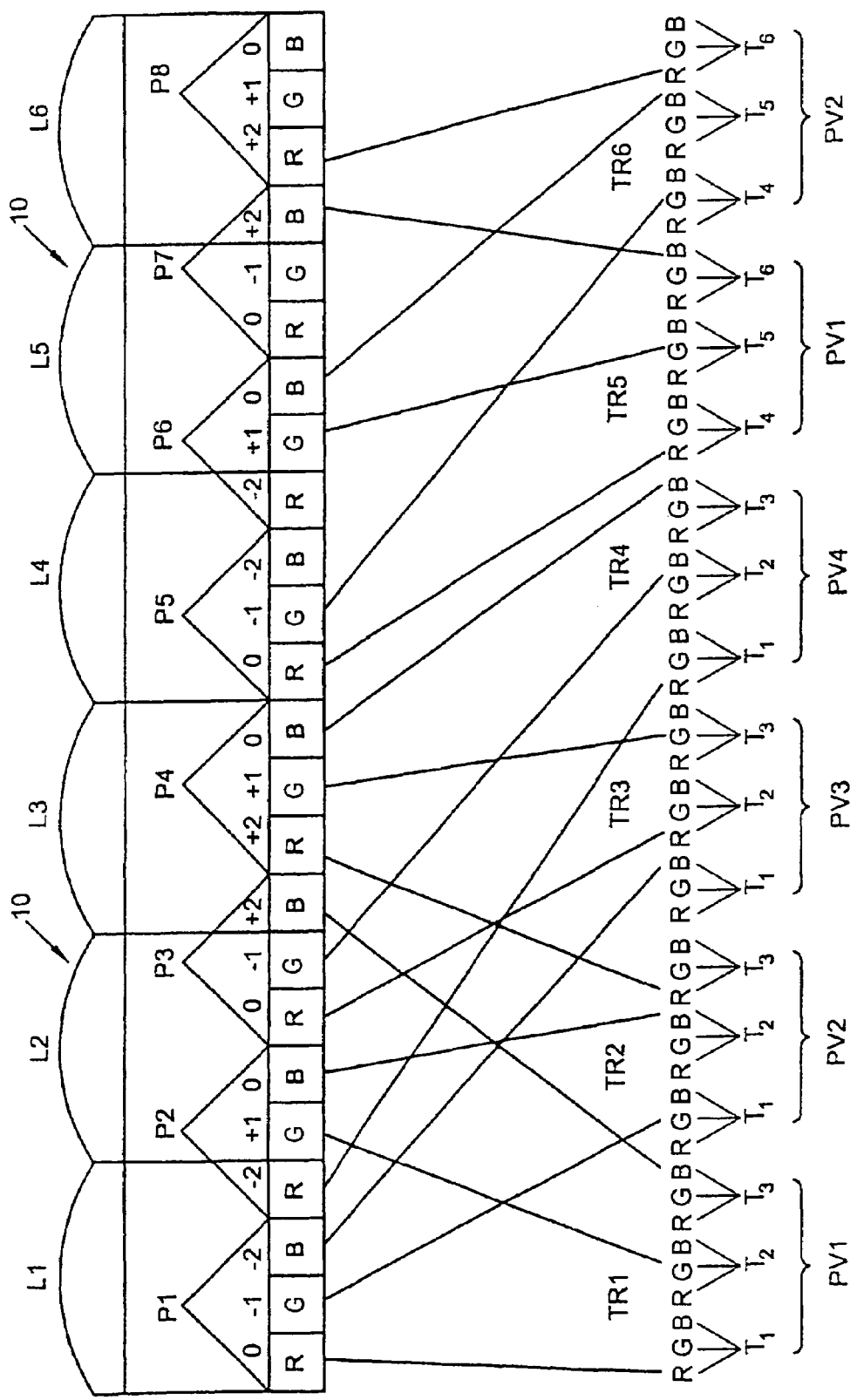
FIG. 1 shows a first variant of the invention applied to the case shown in FIG. 1a of the above-cited PCT application WO 94/26072.

In FIG. 1, corresponding to N=4 and p=3, the high definition image has three times as many pixels in the row direction as the standard image used in FIG. 1a of PCT application WO 94/26072. To facilitate description, it is shown in the form of an interleaved image comprising, in the row direction, groups of p=3 pixels, i.e. the three first pixels $T_1$, $T_2$, $T_3$ of the first viewpoint PV1, the first three pixels $T_1$, $T_2$, $T_3$ of the second viewpoint PV2, the first three pixels $T_1$, $T_2$, $T_3$ of the third viewpoint PV3, the three first pixels $T_1$, $T_2$, $T_3$ of the fourth viewpoint PV4, and then the next three pixels $T_4$, $T_5$, $T_6$ of PV1, the next three pixels $T_4$, $T_5$, $T_6$ of PV2, etc.

In the row direction the screen presents display pixels P1, P2, P3, ..., PM, each made of p=3 color points corresponding to the red R, green G, and blue B color components. The lens array 10 has lenses L1, L2, L3, ... at a pitch equal to four times the pitch of the color points in the display pixels, which means that the first lens L1 is situated in register with the components R, G, and B of P1 and the component R of P2, lens L2 is situated in register with the components G and B of P2 and the components R and G of P3, and so on.

Instead of distributing the R, G, and B components of the first pixel of the standard image between the points of corresponding color components of the pixels P1, P2, and P3 respectively, in the invention this distribution is performed by conserving only one of the color points of each of the pixels $T_1$, $T_2$, $T_3$ of the first viewpoint PV1, respectively for the colors R, G, and B. The same applies with circular permutation of the color components for the first three pixels $T_1$, $T_2$, $T_3$ of the other viewpoints PV2, PV3, and PV4.

For viewpoint PV1, the R color point of $T_1$ is displayed at the corresponding R color point of P1, the G color point of $T_2$ is displayed at the corresponding G color point of P2, and the B color point of $T_3$ is displayed at the corresponding B color point of P3. The R color point of $T_1$, G of $T_2$, and B of $T_3$ thus constitute a display triplet TR1 representing the first pixel of the image to be displayed.

For viewpoint PV2, the G color points of $T_1$, B of $T_2$ and R of $T_3$, which constitute a triplet TR2 representing the second pixel of the image to be displayed are displayed respectively at the G color point of P1, B of P2, and R of P4. For viewpoint PV3, the B color point of $T_1$, R of $T_2$, and G of $T_3$, which constitute a triplet TR3 are respectively displayed at the B color point of P1, R of P3, and G of P4. For viewpoint PV4, the R color point of $T_1$, G of $T_2$, and B of $T_3$, which constitute a triplet TR4 are respectively displayed at the R color point of P2, G of P3, and B of P4, thereby terminating the sequence. The sequence is repeated for the R color point of $T_4$, G of $T_5$, and B of $T_6$ which constitute the triplet TR5, for viewpoint PV1, which are displayed respectively at the R color point of P5, G of P6, and B of P7, and so on. This distribution in space starting from an image having three times as many pixels in the row direction serves to increase the brightness definition of the image while conserving its color definition. At a nominal viewing position, an observer sees either viewpoint PV1 and PV3 or viewpoints PV2 and PV4. In the first case, the left eye sees the R, G, and B components through three successive lenses while the right eye sees the B, R, and G components. In the second, the left eye sees the G, B, and R components in three successive lenses while the right eye sees the R, G, and B components. The same applies when the observer is in a position to see viewpoints PV1 & PV2, or PV2 & PV3, or PV3 & PV4.

This complementary effect between the eyes and between the lenses makes it possible, as stated above, to attenuate the perceived impact of low color resolution in stereoscopic vision.

Figure 2:
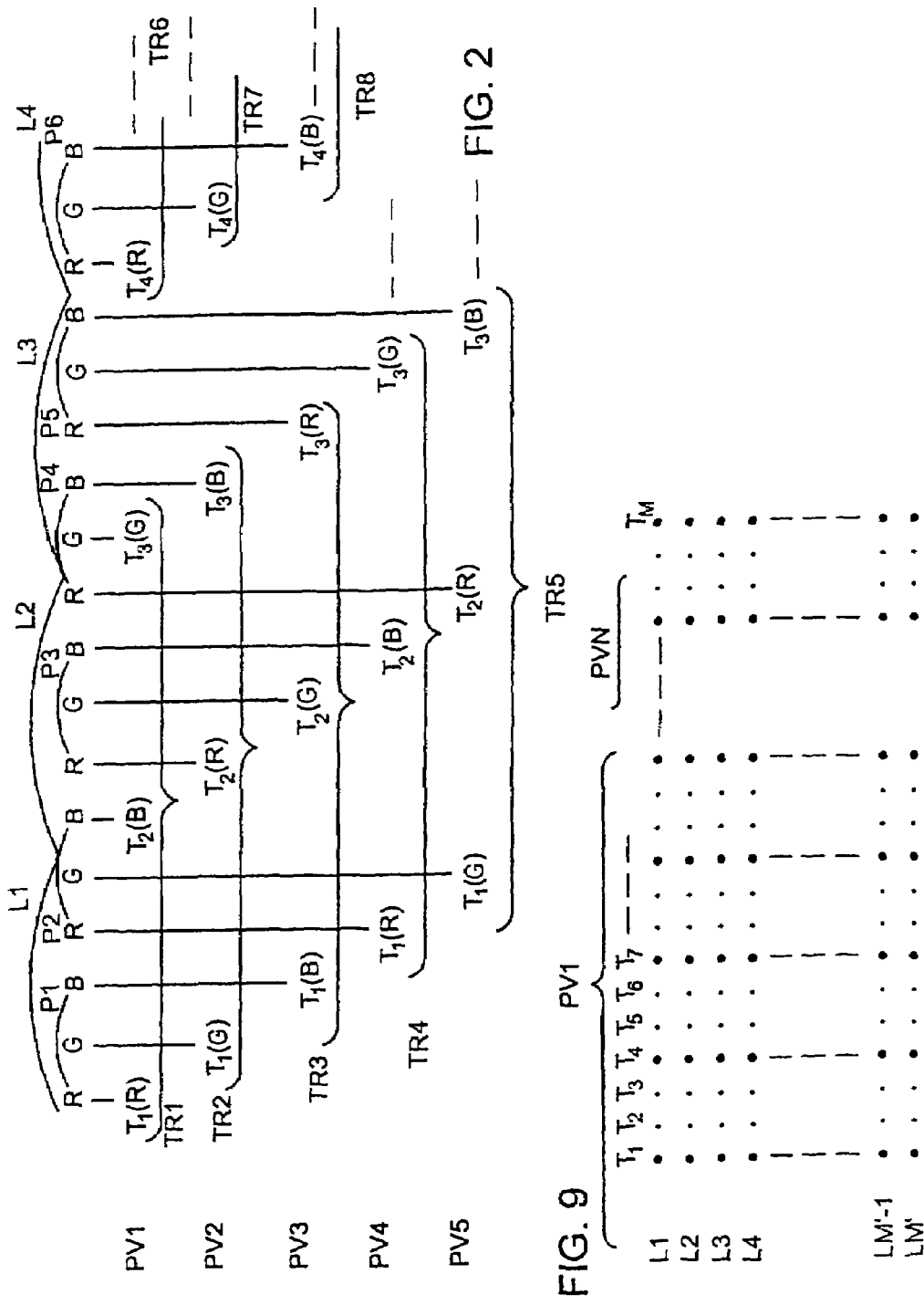
FIGS. 2 and 3 show variants corresponding respectively to 5 and to 7 viewpoints.

FIG. 2 corresponds to the case where there are five viewpoints (N=5). The pitch of the lenses L1, L2, ... of the array 10 is equal to N=5 times the pitch of the color points of the display pixels P1, P2, .... For viewpoint PV1, the triplet TR1 which represents the first pixel of the image to be displayed is constituted by the red component of the first pixel $T_1$ written $T_1(R)$, the blue component of the second pixel $T_2$ written $T_2(B)$, and the green component of the third pixel $T_3$ written $T_3(G)$. $T_1(R)$ is displayed at the red color point R of display pixel $P_1$, $T_2(B)$ is displayed at the blue color point of P2, and $T_3(G)$ is displayed at the green color point of P4. The display rule is represented in FIG. 2 in the form of a table. The triplets TR1, TR2, TR3, TR4, and TR5 correspond respectively to viewpoints PV1, PV2, ..., PV5. The triplets TR6, ..., TR10 correspond respectively to viewpoints PV1, ..., PV5, and so on, modulo 5.

Figure 3:
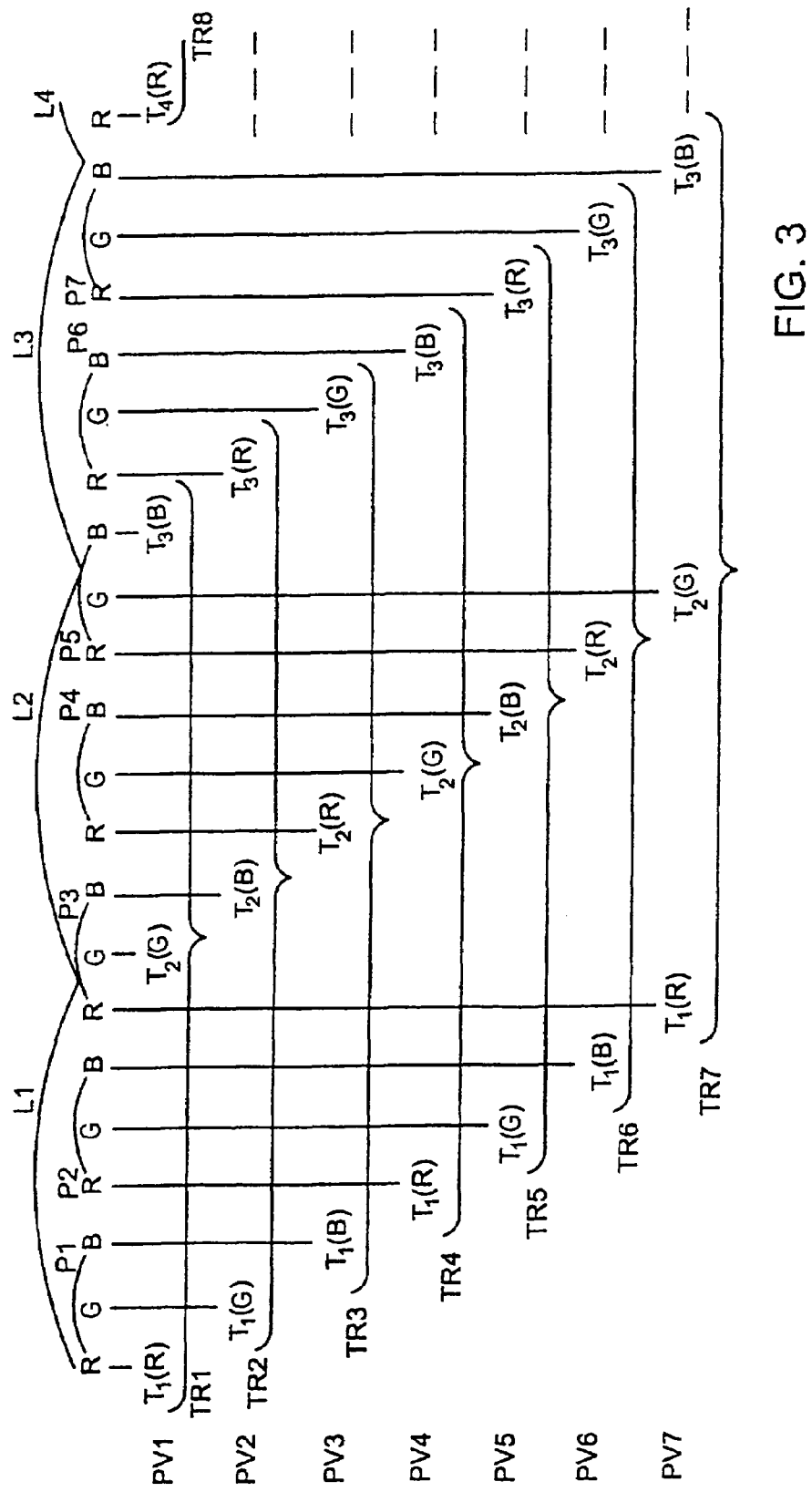

FIG. 3 corresponds to the case where there are seven viewpoints (N=7). The pitch of the lenses L1, L2, ... of the array 10 is now equal to seven times the pitch of the color points of the display pixels P1, P2, .... The presentation in the form of a table is similar to that of FIG. 2. The triplets TR1, ..., TR7 correspond respectively to viewpoints PV1, ..., PV7, and so on, modulo 7.

Figure 4:
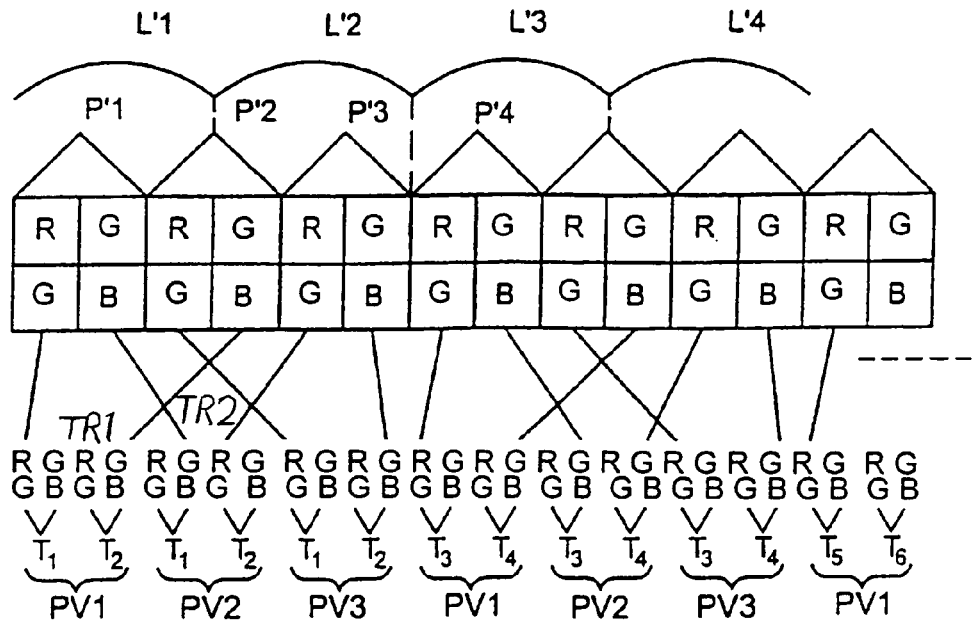
FIG. 4 shows a second variant of the invention applied to the case shown in FIG. 1b of the above-cited PCT application.

FIG. 4 shows the case (p=2) where the screen pixels are made up of two color components placed side by side in the horizontal or row direction, specifically an (R, G) color component constituted by vertically superposing a red component R and a green component G of half-intensity, and a (G, B) color component constituted by vertically superposing a half-intensity green component G and a blue component B. The lens array has lenses L1 at a pitch equal to N=3 times the pitch of the color components. The increase in definition is obtained from an image having twice as many pixels in the row direction as the standard image used in FIG. 1b of PCT application WO 94/26072.

For viewpoint PV1, the display triplet TR1 is constituted by the (R, G) color component of pixel $T_1$ of viewpoint PV1 of the image to be displayed, and the (G, B) color component of pixel $T_2$ of viewpoint PV1 of the image to be displayed. For viewpoint PV2, the display triplet TR2 is constituted by the (G, B) color component of pixel $T_1$ of viewpoint PV2, and by the (R, G) color component of pixel $T_2$ of viewpoint PV2. The (R, G) component of pixel $T_1$ of PV1 is displayed as the (R, G) component of the display pixel P'1. The (G, B)

component of pixel $T_2$ of PV1 is displayed as the (G, B) component of pixel P'2. The (G, B) component of pixel $T_1$ of PV2 is displayed as the (G, B) component of pixel P'1. The (R, G) component of pixel $T_2$ of PV2 is displayed as the (R, G) component of pixel P'3, and so on. In the nominal viewing position, either the left eye sees viewpoint PV1 and the right eye sees viewpoint PV2, or the left eye sees viewpoint PV2, and the right eye sees viewpoint PV3. In the first case, the left eye sees the (R, G) and (G, B) components in successive lenses while the right eye seeks the (G, B) and (R, G) components in the same lenses. In the second case, the left eye sees the (G, B) and (R, G) components in successive lenses while the right eye sees the (R, G) and the (G, B) components in the same lenses.

The colors are thus complementary between one eye and the other and between one lens and the other, but in this case for the three components having the colors red, green, and blue, which is favorable from the point of view of perception.

Figure 5:
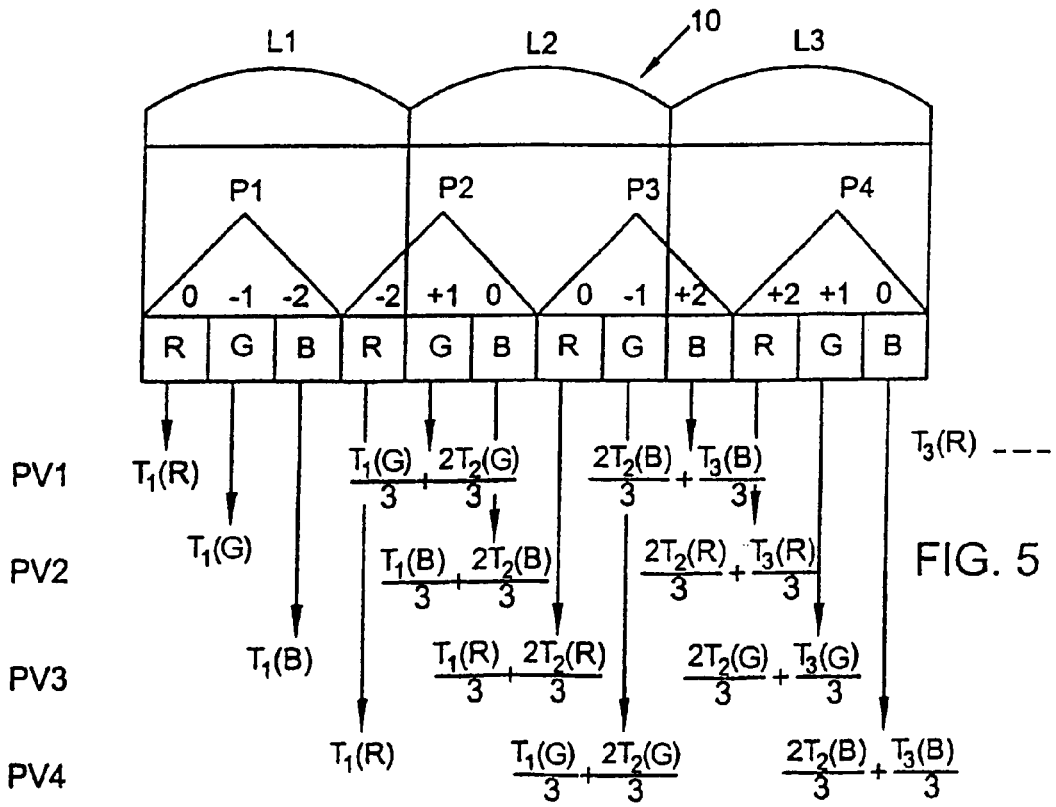
FIG. 5 shows a third variant of the invention applied to the case shown in FIG. 1a of the above-cited PCT application, with image definition being increased in two stages.

FIG. 5 shows the same case as FIG. 1 except that the image to be displayed is generated from an "intermediate" autostereoscopic image having definition in the row direction that is twice, and not three times that of a standard image of the kind used in FIG. 1a of PCT application WO 94/26072. This intermediate image can be an image provided by a camera, or it can be an image coming from a video data library, or indeed an image computed by increasing definition from a standard image. The intermediate image can also be a synthesized image.

If it is desired to retain image information during display, it is necessary to compute three color components for display for each viewpoint starting from a pair of pixels $T_1$ and $T_2$, $T_3$ and $T_4$, etc.

In the example shown, this is done by linear interpolation using three successive pixels $T_1$, $T_2$, $T_3$; $T_3$, $T_4$, $T_5$, etc.

The $T_1(R)$ component of PV1 is displayed as the R component of P1. The interpolated component:

$$\frac{T_1(G)}{3} + \frac{2T_2(G)}{3}$$

is displayed as the G component of P2.
The interpolated component:

$$\frac{2T_2(B)}{3} + \frac{T_3(B)}{3}$$

is displayed as the blue component of P3, and so on, as shown in the form of a table in FIG. 5.

The method in the variants described above can be applied directly to improving definition in the row direction of the device described in European application No. 0 791 847. In the context of FIGS. 4A, 4B, 6A, and 6B of that application, definition can be increased by a factor of three. In the case shown in FIGS. 5A and 5B, it can be increased by no more than a factor of two.

To increase definition both in the row direction and in the column direction, the starting point is an image whose definition is higher in both directions.

In FIGS. 6a and 6b, definition is increased by a factor of 3, both in the row direction and in the column direction. Thus, the first pixel to be displayed for viewpoints PV1, PV2, . . . , is constituted by a matrix of nine pixels $T_{11}$, . . . , $T_{33}$. For PV1, the useful components are the red component $T_{11}(R)$ of $T_{11}$, the green component $T_{22}(G)$ of $T_{22}$, and the blue component $T_{33}(B)$ of $T_{33}$. For PV2, the useful components are the green component $T_{11}(G)$ of $T_{11}$, the blue component $T_{22}(B)$ of $T_{22}$, and the red component $T_{33}(R)$ of $T_{33}$, and so on. To generate the image to be displayed, it is necessary to compute the useful components only for display purposes.

In FIGS. 7a and 7b, definition is increased by a factor of 2 in the row direction and by a factor of 3 in the column direction. The pixels to be displayed for the first viewpoint are the components $T_{11}(R)$, $T_{21}(G)$, and $T_{31}(B)$. For the other viewpoints, the components to be retained can be deduced by permutation.

In the case shown in FIGS. 8a and 8b, definition is increased by a factor of 3 in the row direction and by a factor of 2 in the column direction. For the first pixel to be displayed for each viewpoint, the components $T_{11}(R)$, $T_{22}(B)$, and $T_{13}(G)$ are retained. For the other viewpoints, the components to be retained are deduced by permutation.

FIG. 9 shows definition being increased by a factor of 3 in the row direction starting from an image in "N image" mode as described in the Applicant's PCT application WO 94/26071, and in which the pixels written $T_1, T_4, T_7 \ldots, T_M$ are represented conventionally by a dot of larger size. For each of the original pixels $T_1, T_4, T_7, \ldots, T_M$ for each viewpoint or elementary image, two intermediate pixels ($T_2$, $T_3$), ($T_5$, $T_6$), etc. are computed, e.g. by interpolation, so as to increase definition.

The method of the invention makes it possible, starting from images of standard video definition, or from images that intrinsically present higher definition, whether filmed images or synthesized images made using the method described in the Applicant's PCT application WO 97/01250, to generate autostereoscopic images having definition that is improved in terms of brightness and that is lower in terms of chrominance.

Each pixel of the autostereoscopic image to be displayed contains information coming from p different points in space. Such an autostereoscopic image for display can also be generated directly from the image supplied by a camera fitted with a single CCD sensor and presenting color filters that follow one another horizontally (RGBRGBRGB, . . . ) and a diverging lens array whose apparent array pitch (i.e. the pitch of the lens array as projected by the optical system for transferring the image onto the single CCD sensor) is equal to that of N color filters, or a converging lens array with symmetrical permutation of groups of N color filters so as to conserve autostereoscopy. For example, for N=4, at a pitch of 12, the following permutation occurs RBGRGRB-GBGRB, etc. This achieves the desired space offset for each of the color points of the autostereoscopic image to be displayed. Image-transferring lens array cameras are described in particular in the Applicant's PCT applications WO 97/26071 and WO 94/25891.

Such an image can be used in a transmission system or it can be recorded on a recording medium such as a hard disk, a DVD disk, a magnetic tape, etc. The image can be displayed on a screen having a lens array placed in front of it. It can also be printed on a paper medium and images can then be seen in relief by using a suitable lens array which can optionally be secured to the paper medium.

In the description above, the terms "row" and "column" mean respectively the horizontal lines and the vertical lines of pixels as seen by a sitting or standing observer, independently of the direction in which the display screen is scanned which can either be horizontal or vertical. For example, for a screen whose scan lines are vertical, then those lines are considered as being "columns".

What is claimed is:

1. A method of autostereoscopically displaying an N-viewpoint image on a screen having display pixels disposed in rows and columns, each display pixel presenting p>1 color points, corresponding to first, second, ..., and $p^{th}$ color components, in which method the pixels of an autostereoscopic image to be displayed are displayed by distributing in space the p color points of each pixel amongst the color points of corresponding color components in p different display pixels, wherein, starting from a "high definition" autostereoscopic image presenting at least as many pixels each having p color points as the N viewpoint image presents color points, said autostereoscopic image to be displayed is generated in which each pixel is comprised of p color points of the corresponding color component of p different pixels in the high definition autostereoscopic image.

2. A method according to claim 1, wherein the high definition autostereoscopic image presents in the row direction as many pixels each having p color points as each image row presents color points.

3. A method according to claim 1, wherein the high definition autostereoscopic image is generated from a starting autostereoscopic image which presents lower definition by using a definition-increasing method, such as an interpolation method, a vectorization method, or an outline search method.

4. A method according to claim 3, wherein said lower definition is screen definition.

5. A method according to claim 3, wherein the high definition autostereoscopic image is generated by generating for each pixel only the color point that is used when generating said autostereoscopic image to be displayed.

6. A method according to claim 3, wherein the definition-increasing method is such that it increases definition in the row direction.

7. A method according to claim 6, wherein the high definition autostereoscopic image is obtained from a starting autostereoscopic image by using said definition-increasing method to generate an intermediate autostereoscopic image presenting either p or p−1 times as many rows and p or p−1 times as many columns of pixels than the screen, and wherein said high definition autostereoscopic image is obtained by selecting those pixels in the intermediate autostereoscopic image whose positions correspond to said distribution in space.

8. A method according to claim 6, wherein the definition-increasing method is such that it increases definition in the column direction.

9. A method according to claim 3, wherein said lower definition is screen definition, and wherein the method uses said definition-increasing method to generate an intermediate autostereoscopic image of increased definition, and then said autostereoscopic image of high definition.

10. A method according to claim 9, wherein p=3 and wherein said increased definition corresponds to doubling the number of pixels in the row and/or column direction.

11. A method according to claim 9, wherein the intermediate autostereoscopic image and/or the high definition autostereoscopic image are generated by computing for each pixel only those color point(s) which are useful.

12. A method according to claim 3, wherein the definition-increasing method is such that it increases definition in the column direction.

13. A method according to claim 1, wherein said autostereoscopic image to be displayed, when ordered so as to interleave the pixels of the N viewpoints making it up in accordance with its display topology, comprises groups of N pixels each of which corresponds to a different viewpoint, the first pixel or a given N pixel group corresponding to a first viewpoint being constituted by a first color point which is the color point of the first color component of the first of said p different pixels of a group of p pixels of the first viewpoint, a second color point which is the color point of the second color component of the second of said different pixels of said group of p pixels of the first viewpoint, ..., and a $p^{th}$ color point which is the color point of the $p^{th}$ color component of the $p^{th}$ of said different pixels of said group of p pixels of the viewpoint, the second pixel of said given group of N pixels which corresponds to a second viewpoint being constituted by a first color point which is the color point of the second color component of the first of said p different pixels of a group of p pixels of the second viewpoint, ..., and a $p^{th}$ color point which is the color point of the first color component of the $p^{th}$ of said p different pixels of the group of p pixels of the second viewpoint, ..., and so on by circular permutation to the $N^{th}$ pixel of said given group which corresponds to the $N^{th}$ viewpoint and to the group of p pixels corresponding thereto.

14. A method according to claim 13, wherein said groups of N pixels are disposed in the row direction.

15. A method according to claim 13, wherein said p different pixels are contiguous.

16. A method according to claim 15, wherein said p different pixels are aligned in the row direction.

17. A method according to claim 1, wherein the p color points of each display pixel are disposed side by side in the row or the column direction.

18. A method according to claim 1, wherein the high definition autostereoscopic image is obtained from a starting autostereoscopic image having either p or p−1 times as many rows and either p or p−1 times as many columns of pixels than the screen, and wherein the high definition autostereoscopic image is obtained by selecting pixels from the starting autostereoscopic image whose positions correspond to said distribution in space.

19. An N viewpoint autostereoscopic image presenting pixels disposed in rows and columns, each pixel being constituted by p color points of a different color component, wherein each of the p color points of each pixel is constituted by a color point of a corresponding color component of the p different pixels of a group of p pixels of a viewpoint of a high definition autostereoscopic image presenting at least as many pixels having p color points as the N viewpoint autostereoscopic image presents color points.

20. An autostereoscopic image according to claim 19, wherein each row of the high definition autostereoscopic image presents as many pixels having p color points as each row of the N viewpoint autostereoscopic image has color points.

21. An autostereoscopic image according to claim 20, wherein said different pixels are in alignment on a diagonal of said high definition autostereoscopic image.

22. An autostereoscopic image according to claim 20, wherein said p different pixels are in alignment in the row direction.

23. An autostereoscopic image according to claim 19, wherein the first, second, and third color components are respectively red, green, and blue.

24. An image displayed or printed on a medium, the image being displayed or printed from an autostereoscopic image according to claim 19 in the form of display points or pixels which are obtained by distributing the p color points of each pixel of said autostereoscopic image between the color points of corresponding color components of p different display pixels.

25. An autostereoscopic image according to claim 19, wherein, when ordered in such a manner as to interleave the pixels of the N viewpoints making it up in accordance with the topology of its display, it comprises groups of N pixels each of which corresponds to a different viewpoint, the first pixel of a given group of N pixels which corresponds to a first viewpoint being constituted by a first color point which is the color point of the first color component of the first of said p different pixels of a p-pixel group of the first viewpoint, a second color point which is the color point of the second color component of the second of said different pixels of the said p-pixel group of the first viewpoint, . . . , and a $p^{th}$ color point which is color point of the $p^{th}$ color component of the $p^{th}$ of said different pixels of said p-pixel group of the viewpoint, the second pixel of said given group of N pixels which corresponds to a second viewpoint being constituted by a first color point which is the color point of the second color component of the first of said p different pixels of a p-pixel group of the second viewpoint, . . . , and a $p^{th}$ color point which is the color point of the first color component of the $p^{th}$ of said p different pixels of said p pixel group of the second viewpoint, and so on by circular permutation to the $N^{th}$ pixel which corresponds to the $N^{th}$ viewpoint and to the p-pixel group corresponding thereto.

\* \* \* \* \*